(12) United States Patent
Hur

(10) Patent No.: US 6,510,838 B2
(45) Date of Patent: Jan. 28, 2003

(54) ANTI-ROLLBACK SYSTEM FOR AUTOMATIC TRANSMISSION AND METHOD THEREOF

(75) Inventor: Kyung-Seon Hur, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 38 days.

(21) Appl. No.: 09/732,902

(22) Filed: Dec. 11, 2000

(65) Prior Publication Data

US 2001/0004618 A1 Jun. 21, 2001

(30) Foreign Application Priority Data

Dec. 15, 1999 (KR) ............................................. 99-57864

(51) Int. Cl.$^7$ ................................................ F02M 3/06
(52) U.S. Cl. .................... 123/339.16; 477/110; 477/114
(58) Field of Search .................................. 477/110, 113, 477/93, 94, 114; 74/462; 123/339.1, 339.14, 339.16; 73/118.1

(56) References Cited

U.S. PATENT DOCUMENTS

| 3,910,389 A | * | 10/1975 | Pleier ......................... 192/221 |
| 4,648,289 A | * | 3/1987 | Kubo et al. .................... 477/93 |
| 4,760,827 A | * | 8/1988 | Schreiber et al. .......... 73/118.1 |
| 5,157,966 A | * | 10/1992 | Lugosi et al. ............... 73/118.1 |
| 5,474,164 A | * | 12/1995 | Berger ...................... 192/219.2 |
| 5,935,041 A | * | 8/1999 | Tsukamoto et al. ......... 477/195 |

FOREIGN PATENT DOCUMENTS

| GB | 1251941 | * 11/1971 |

* cited by examiner

*Primary Examiner*—Charles A. Marmor
*Assistant Examiner*—Ha Ho
(74) *Attorney, Agent, or Firm*—Birch, Stewart, Kolasch & Birch, LLP

(57) ABSTRACT

An anti-rollback system for an automatic transmission includes an output gear connected to an output shaft of the automatic transmission, and a magnetic sensor for detecting output rpm of the output gear. The magnetic sensor is electrically connected to an. ECU (electronic control unit) and the output gear has a plurality of teeth, each tooth having a slot formed on its upper surface thereof.

4 Claims, 4 Drawing Sheets

ANTI-ROLLBACK SYSTEM FOR AUTOMATIC TRANSMISSION AND METHOD THEREOF

BACKGROUND OF THE INVENTION (a) Field of the Invention

The present invention relates to an automotive automatic transmission, and in particular, to an anti-rollback system and method capable of preventing a vehicle from rolling back when starting on a slope, using an improved magnetic sensor mechanism which detects a rotational direction of an output shaft so as to optimally control the automatic transmission.

(b) Description of the Related Art

FIG. 1 and FIG. 2 show respectively a conventional magnetic sensor mechanism and a graph showing an electromagnetic wave form generated by the magnetic sensor.

The conventional anti-rollback system comprises a magnetic sensor mechanism including an output gear 4 mounted on an output shaft 2 of an automatic transmission (not shown) and a magnetic sensor 8 for detecting output torque by sensing magnetic teeth 6 formed on the output gear 4, signals detected by the magnetic sensor 8 being parameters for an ECU (electronic control unit) 10 to control vehicle speed.

If the magnetic sensor 8 detects a rotation of the output shaft 2, an electromagnetic wave shows a waveform similar to that shown in FIG. 2 such that the ECU 10 controls parts of a vehicle on the basis of this signal.

However, when a vehicle equipped with this magnetic sensor mechanism starts after a stop on an uphill slope, the vehicle may roll back a little before moving forward, which startles a driver and may cause a minor collision. This is because the ECU can not distinguish the rotational directions of the output shaft on the basis of the signal having a monotonous waveform from the magnetic sensor.

Furthermore, since an engine rpm (revolutions per minute) must be up to prevent the vehicle from rolling back on slope-starting, the idle rpm causes both fuel to be wasted and vibration noise. In addition, the increased rpm causes acceleration shocks to be aggravated on a downhill slope.

SUMMARY OF THE INVENTION

The present invention has been made in an effort to solve the above problems of the prior art.

It is an object of the present invention to provide an anti-rollback mechanism capable of preventing a vehicle from rolling back on an uphill slope using an improved magnetic sensor mechanism which distinguishes rotational directions of an output shaft of an automatic transmission.

To achieve the above object, an anti-rollback system for an automatic transmission comprises an output gear connected to an output shaft of the automatic transmission, and a magnetic sensor for detecting output rpm of the output gear, the magnetic sensor being electrically connected to an ECU (electronic control unit), wherein the output gear has a plurality of teeth, each tooth having a slot formed on an upper surface thereof.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
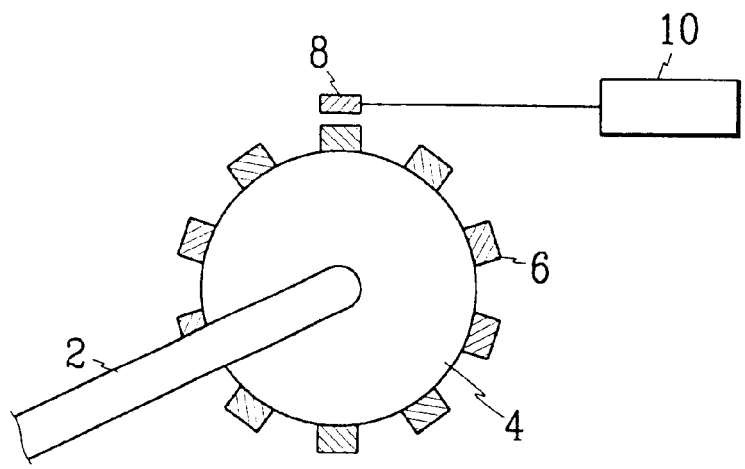
FIG. 1 is a schematic view of a magnetic sensor mechanism of a conventional anti-rollback system.
Figure 2:
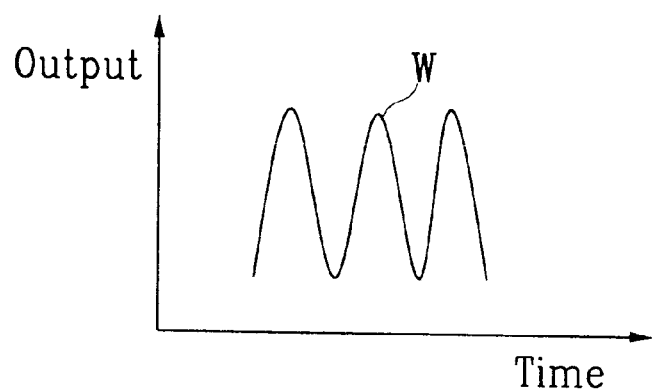
FIG. 2 is a graph showing an electromagnetic wave form generated by the magnetic sensor of the conventional anti-rollback mechanism of FIG. 1.
Figure 3:
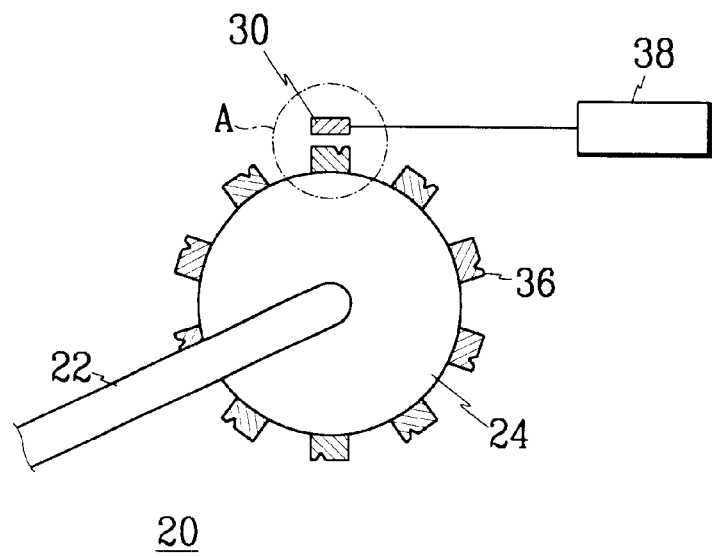
FIG. 3 is a schematic view of a magnetic sensor mechanism of an anti-rollback system according to a preferred embodiment of the present invention.

FIG. 3 shows a magnetic sensor mechanism of an anti-rollback system according to the preferred embodiment of the present invention.

The magnetic sensor mechanism 20 of the anti-rollback system comprises an output gear 24 mounted on an output shaft 22 of an automatic transmission (not shown) and a sensor 30 for detecting rotational speed and direction of the output shaft 22 which is electrically connected to an ECU (electronic control unit).

Figure 4:
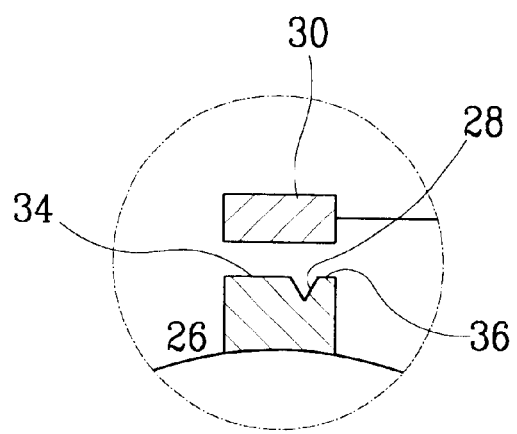
FIG. 4 is an enlarged view of a circuled portion A of FIG. 1.

As shown in FIG. 4, the output gear 24 is provided with a plurality of magnetic teeth 26 having a slot 28 lopsidedly formed on an end surface of each tooth such that the surface of the tooth 26 is split into a broad surface 34 and a narrow surface 36.

The magnetic sensor 30 is located just above the output gear 24 such that the magnetic sensor 30 faces the end surface of each tooth 26.

Figure 5:
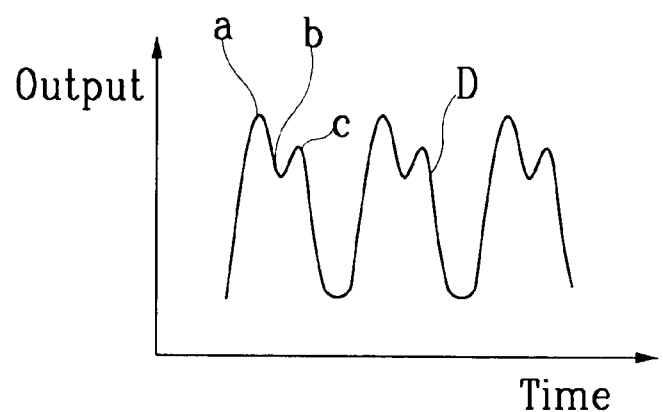
FIG. 5 is a graph showing an electromagnetic wave form generated by the magnetic sensor of the anti-rollback mechanism of FIG. 3 when a vehicle is driving forward.
Figure 6:
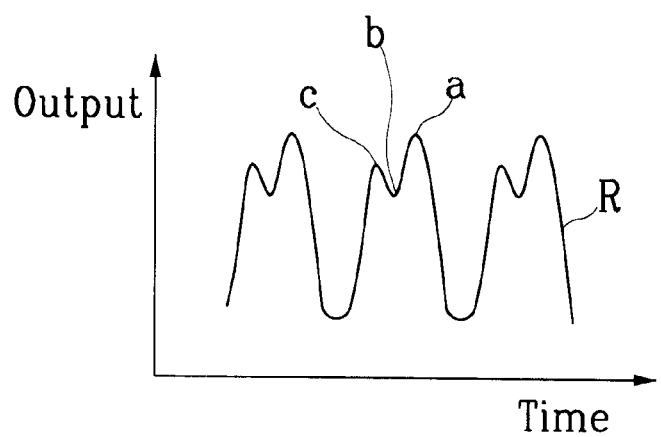
FIG. 6 is a graph showing an electromagnetic wave form generated by the magnetic sensor of the anti-rollback mechanism of FIG. 3 when the vehicle is driving backward.
Figure 7:
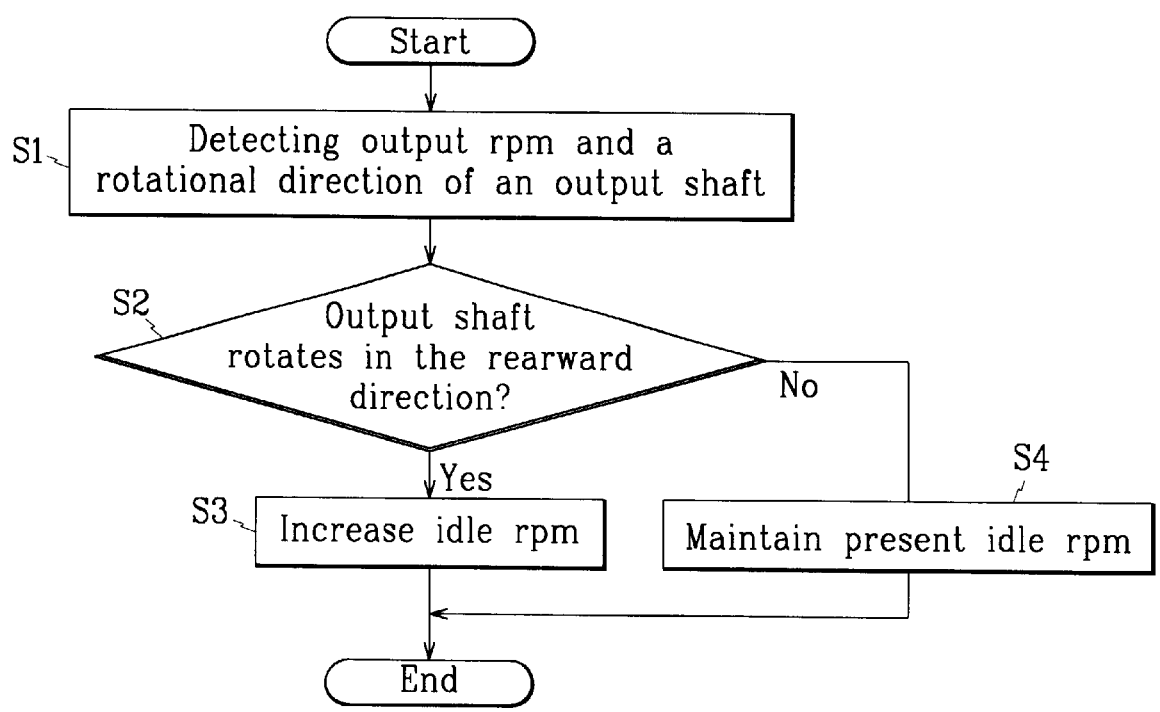
FIG. 7 is a block diagram showing operational steps of the anti-rollback mechanism of the present invention.

Regarding FIGS. 5 and 6, points a, b, and c of the electromagnetic wave forms generated when a tooth 26 passes under the magnetic sensor 30 respectively correspond to the broad surface 34, the slot 28, and the narrow surface 36.

The operation of the anti-rollback system according to the preferred embodiment of the present invention will be described hereinafter.

The magnetic sensor 30 detects output rpm and rotational direction of an output shaft at step SI and sends an electric signal to the ECU 38. The ECU 38 determines if a rotational direction of the output shaft 22 is in a rearward direction at step S2.

When the output gear 24 rotates in the rearward direction, i.e. the vehicle rolls back on a slope, the tooth 26 of the output gear 24 passes under the magnetic sensor 30 in the order of the narrow surface 36, slot 28, and broad surface 34 such that the magnetic sensor 30 generates a signal having an electromagnetic wave form (R) shown in FIG. 6. On the basis of this signal, the ECU 38 determines that the vehicle is moving downward on an uphill slope and controls the automatic transmission to increase the current idle rpm at step S3. Accordingly, the increased idle rpm prevents the vehicle from rolling downward while the vehicle is starting on the uphill slope.

When the output gear 24 rotates in the forward direction, the tooth 26 of the output gear 24 passes under the magnetic sensor 30 in the order of the broad surface 34, slot 28, and narrow surface 36 such that the magnetic sensor 30 generates a signal having an electromagnetic wave form (D) shown in FIG. 5. On the basis of this signal, the ECU 38 determines the vehicle is driving upward on a downhill slope and controls the transmission (not shown) in such a way that the automatic transmission maintains the current idle rpm at step S4. This means the vehicle does not experience acceleration shocks when the vehicle starts on a downhill slope.

As described above, since the anti-rollback system of the present invention is provided with the improved magnetic sensor mechanism which can distinguishably detect the rpm and rotational direction of the output shaft of the transmission, it is possible to prevent the vehicle from rolling back when the vehicle is starting on an uphill slope and from experiencing acceleration shock when the vehicle is starting on a downhill slope by controlling the automatic transmission in accordance with the vehicle and road conditions. Also, the avoidance of unnecessary idle rpm increases on a downhill slope reduces idle noises and vibrations as well as fuel waste.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An anti-rollback system for an automatic transmission comprising:

an output gear connected to an output shaft of the automatic transmission; and a magnetic sensor for detecting output rpm of the output gear, the magnetic sensor being electrically connected to an electronic control unit ECU, wherein the output gear has a plurality of teeth, each tooth having a slot formed on an upper surface thereof, and wherein the ECU contains means for determining if the output shaft of the automatic transmission rotates in a rearward direction in relation to a vehicle's driving direction on the basis of electromagnetic wave signals generated by the magnetic sensor; and means for regulating a current idle rpm on the basis of said determination.

2. The anti-rollback system of claim 1 wherein the slot divides the upper surface of the tooth into a broad part and a narrow part.

3. The anti-rollback system of claim 1, wherein the ECU provides a means for generating a signal indicative of increasing a current idle rpm when the output shaft of the automatic transmission rotates in the rearward direction.

4. The anti-rollback system of claim 3, wherein the ECU provides a means for generating a signal indicative of maintaining a current idle rpm when the output shaft of the automatic transmission rotates in a forward direction.

* * * * *